Jan. 5, 1932.    J. J. HICKS    1,839,676
TUBING COUPLING
Filed Dec. 22, 1930
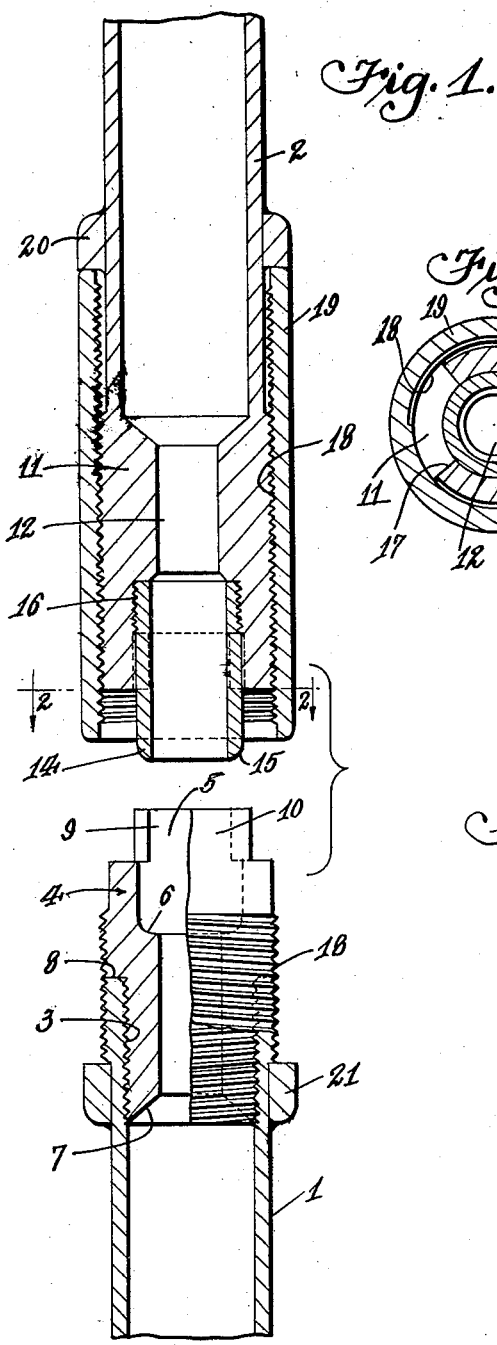
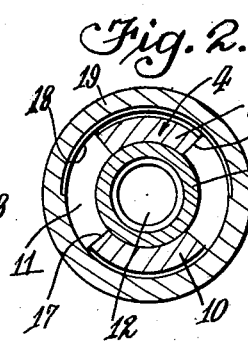
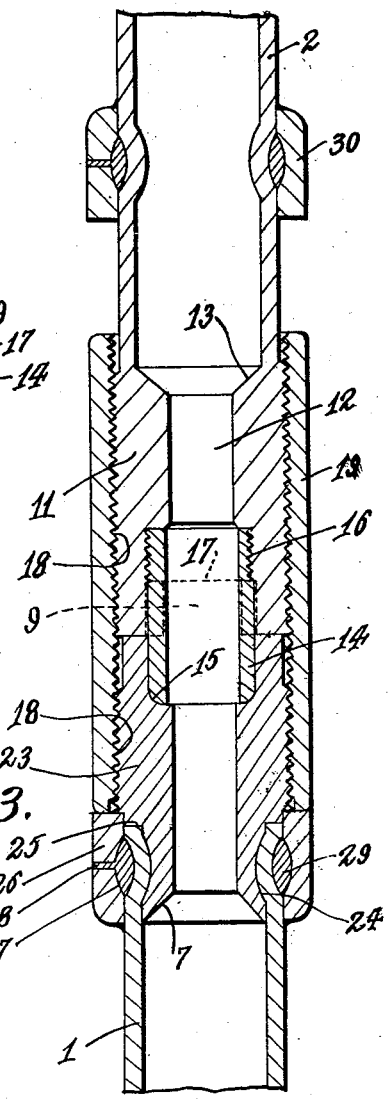
Inventor
John J. Hicks
By Lyon & Lyon
Attorneys Patented Jan. 5, 1932

1,839,676

UNITED STATES PATENT OFFICE

JOHN J. HICKS, OF MONOLITH, CALIFORNIA

TUBING COUPLING

Application filed December 22, 1930. Serial No. 503,863.

This invention relates to a coupling for drill stem, tubing, drill rods, macaroni, and other tubular drilling tools.

An object of this invention is to disclose and provide a coupling for detachably connecting two aligned sections of sucker rods, drill stem, tubing, macaroni or the like, so that they will not be subject to accidental disconnection.

Another object is to disclose and provide an effective coupling by means of which torque may be transmitted in either direction without causing such joint to part.

Another object is to disclose and provide a coupling for tubular sections by means of which a tight joint may be obtained.

A still further object is to disclose and provide a coupling for drill stems and tubing by means of which torque may be transmitted and which may be readily assembled without the possibility of stripping threads from the coupling sections.

Other objects, uses and advantages of this invention will become apparent from the following detailed description of preferred constructions, it being understood that the appended drawings used in illustrating the invention are merely illustrative of the type of joint embraced by this invention, the said invention not being limited to the specific forms shown in these drawings.

In the drawings:

Fig. 1 is a side elevation mainly in vertical section of the ends of an aligned tubular member or drill stem in position for connection.

Fig. 2 is a transverse section through one end of the coupling, said section being taken along the plane 2—2 indicated in Fig. 1.

Fig. 3 is a longitudinal section of slightly modified form of coupling.

As shown in the drawings, two aligned sections of drill pipe 1 and 2 are each provided with end members. For example, the drill pipe 1 is internally threaded as indicated at 3 so as to receive a right hand thread carried by an end member 4. The end member 4 is provided with a bore indicated at 5 and a seat 6. The end member 4 may be provided with a conical or countersunk portion 7 leading to the bore 5 so as to reduce fluid friction. The end member 4 may for a portion of its length be of small diameter and this smaller portion may be exteriorly threaded so as to engage the internal threads of the tube member 1. The exterior portion of the end member 4 may be of greater diameter, thereby providing a shoulder 8 against which the end of the drill pipe 1 may rest when the end member 4 is threaded into the drill pipe 1.

The end member 4 may also be provided with two jaws 9 and 10, the jaws 9 and 10 being substantially diametrically opposed and extending longitudinally from the end member 4. Preferably such end members are of differing cross section and are provided with plane sides lying in planes passing through the longitudinal axis of the end member 4 and the drill pipe 1.

The end of the drill pipe 2 may be provided with a thickened end portion 11 provided with a bore 12 and tapering walls 13 connecting the main portion of the drill pipe 2 with the bore 12. Inserted into the end of the drill pipe 2 may be a tubular end member 14 adapted to be slidably inserted into the end member 4.

The outer end of the tubular member 14 may be curved as indicated at 15 so as to permit the end member 14 to seat upon the seat 6 carried by the end member 4. The end member 14 may be provided exteriorly with a right hand thread so as to permit threaded engagement with the portion 11 of the drill pipe 2 as indicated at 16. The end 11 of the drill pipe 2 may also be provided with recesses such as the recess 17, adapted to receive the jaws 9 and 10 carried by the end member 4. The recesses 17 are substantially the same cross section as the jaws 9 and 10 and inasmuch as the jaws 9 and 10 are of different cross sections, the end member 4 will fit into the end member 11 and the recesses 17 therein in only one position.

The ends of drill pipes 1 and 2 are exteriorly threaded with a left hand thread indicated at 18, the thread 18 cut on the exterior surfaces of the drill pipe 1 being a continuation of the thread cut on the exterior of the drill pipe 2. It will be noted that the left hand thread 18 is also cut in a portion of the end member 4.

A sleeve 19 internally threaded to permit being screwed over the left hand threads 18 is carried by the end of the drill pipe 2. A stop or ring 20 is carried by the drill pipe 2 so that when the sleeve 19 is screwed down against the stop 20, it will permit the ready insertion of the drill pipe 1 and particularly of the jaws 9 and 10 carried by the end member 4 into the recesses 17 formed in the end of the drill pipe 2.

The jaws 9 and 10 being of different diameters, will only fit into the recesses 17 in one definite position and when they have been inserted into the recesses 17 in such position, then the sleeve 19 may be screwed onto the threads 18 formed in the exterior of the end member 4 and drill pipe 1 without any difficulty, and as has been stated hereinabove, the thread 18 formed in the end of drill pipe 1 is a continuation of the thread 18 formed in the drill pipe 2. The drill pipe 1 is also provided with a stop or collar 21 against which the sleeve 19 may be screwed into abutting relation when the drill pipes 1 and 2 have been caused to interengage and the sleeve 19 screwed onto the end of the drill pipe 1.

It is to be noticed that the exterior threads 18 are left hand whereas the threads 3 and 16 formed on the members 4 and 14 are right handed. For this reason, once the coupling has been tightened, the drill stem may be rotated either to the right or to the left without the possibility of accidentally breaking the joint. Torque is transmitted not only by means of the sleeve 19 in abutting relation with the stop 21 but is also transmitted by the jaws 9 and 10 fitting into the recesses 17 of the drill pipe 2. A left hand rotation of the upper pipe 2 causes the right hand thread on end member 4 to unscrew a little, thereby throwing a strain on threads of sleeve 19 and preventing any possible danger of unscrewing coupling, whereas a right hand rotation of the pipe 2 causes the end member 4 to abut more tightly against the pipe 2 at the shoulder 8. A positive connection is thus maintained at all times.

Fig. 3 shows a slightly modified form of construction. The end member 23 carried by the drill pipe 1 is connected thereto by reason of a recess 24 formed in the end of the end member 23, the end of the drill pipe 1 being pressed into said recess and bearing against a transverse shoulder 25 formed in the end member 23. The stop ring 26 may be formed with an internal recess 27 and a transverse aperture 28 leading to the recess 27. Sealing metal indicated at 29 may then be poured into the recess so as to firmly hold the ring in place as well as holding the pressed portion of the drill pipe 1 in contact with the end member 23.

A similar form of construction may be employed for holding the stop ring 30 in place, namely, an indentation formed in the drill pipe 2, a concaved depression on the inner surfaces of the ring 30, and a sealing metal 29 in the cavity thus formed between the drill pipe and the stop ring 30. The stop rings 20 and 21 shown in Fig. 1 are preferably welded directly to the pipe 1.

A coupling of the character described hereinabove is of great utility inasmuch as it is not necessary during drilling operations, for example, to rotate the drill stem or drill pipe continuously in one direction. Instead, the form of coupling described hereinabove permits rotation of the drill stem in both directions, thereby facilitating the boring of straight holes.

It has been found that the reason for deviation from the vertical in the boring of deep oil wells is primarily caused by the fact that the drilling tools continuously rotate in one direction. If, however, the drilling operation consists of alternate periods of rotation in opposed directions, then a more uniformly straight hole is obtained. The coupling of this invention prevents accidental disconnection of the drill pipe because of the left to right rotation.

Although a particular form of pipe joint has been described in detail, it is to be understood that the invention is not limited to the specific form shown but instead includes all such changes and modifications as come within the scope of the appended claims.

I claim:

1. A coupling for drill stem and tubing comprising two adjoining aligned sections of tubing, an end member secured to the end of one of said aligned tubing sections, said end member being provided with a longitudinal bore, a seat in said bore, and two longitudinally extending jaws of differing cross section, a tubular end member secured to the end of the other of said aligned tubing sections, said tubular end member being adapted to be slidably inserted into the bore of said first named end member and seat therein, recesses formed in the end of said other tubing section, said recesses being of differing cross section and adapted to receive said jaws, and a thread on the exterior surfaces of each end of said aligned sections, the thread on one being a continuation of the other, and a sleeve threadedly carried on said threaded ends and adapted to hold said ends together.

2. A coupling for drill stem and tubing comprising two adjoining aligned sections of tubing, an end member secured to the end of said aligned tubing sections, said end member being provided with a longitudinal bore, a seat in said bore and two longitudinally extending jaws of differing cross section, a tubular end member secured to the end of the other of said aligned tubing sections, said tubular end member being adapted to be slidably inserted into the bore of said first named end member to seat therein, recesses formed in the end of said other tubing section, said recesses being of differing cross section and adapted to receive said jaws, a thread on the exterior surfaces of each end of said aligned sections, the thread on one being a continuation of the thread on the other, an internally threaded sleeve carried by said exteriorly threaded tubing sections, and fixed stops carried by each of said tubing sections spaced from the ends thereof and adapted to form a seat for said sleeve.

3. A coupling for drill stem and tubing comprising two adjoining aligned sections of tubing, an end member provided with a right hand thread threadedly connected to the end of one of said aligned tubing sections, said end member being provided with a shoulder adapted to come into abutting relation with the end of said tubing section, a longitudinal bore in said end member, a seat in said bore and two longitudinally extending jaws of differing cross section carried by said end member, a tubular end member provided with an external right hand thread threadedly carried by the other of said aligned tubing sections, said tubular end member protruding beyond the end of said other tubing section, said tubular end member being adapted to be slidably inserted into the bore of said first named end member to seat therein, recesses formed in the end of said other tubing section, said recesses being of differing cross section and adapted to slidably receive said jaws, a continuous left hand thread on the exterior surface of each end of said aligned sections, the thread on one being a continuation of the thread on the other, an internally threaded sleeve carried by said threaded ends of said tubing sections, and stops carried by each of said tubing sections, said stops being spaced from the ends of said section, one of said stops being adapted to permit said sleeve to come in abutting relation thereto when said sleeve covers the joint between said aligned tubing sections.

Signed at Monolith, Calif., this 1st day of December, 1930.

JOHN J. HICKS.